US009129628B1

(12) United States Patent
Fallone et al.

(10) Patent No.: US 9,129,628 B1
(45) Date of Patent: Sep. 8, 2015

(54) DATA MANAGEMENT FOR DATA STORAGE DEVICE WITH DIFFERENT TRACK DENSITY REGIONS

(71) Applicant: Western Digital Technologies, Inc., Irvine, CA (US)

(72) Inventors: Robert M. Fallone, Irvine, CA (US); William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/522,451

(22) Filed: Oct. 23, 2014

(51) Int. Cl.

| | |
|---|---|
| ***G11B 5/55*** | (2006.01) |
| ***G11B 5/596*** | (2006.01) |
| ***G11B 5/09*** | (2006.01) |
| ***G11B 20/12*** | (2006.01) |
| ***G11B 5/012*** | (2006.01) |
| *G11B 20/10* | (2006.01) |

(52) U.S. Cl.

CPC ................ *G11B 5/596* (2013.01); *G11B 5/012* (2013.01); *G11B 5/09* (2013.01); *G11B 5/5521* (2013.01); *G11B 20/1217* (2013.01); *G11B 5/5526* (2013.01); *G11B 20/10212* (2013.01)

(58) Field of Classification Search

CPC ............. G11B 20/10481; G11B 20/22; G11B 20/10009; G11B 20/10055; G11B 20/1285; G11B 20/10037; G11B 20/1217; G11B 5/596; G11B 5/012; G11B 5/5521; G11B 5/59633; G11B 5/5526; G11B 5/09; G11B 5/59627

USPC .................................... 360/15, 51, 46, 77.08

See application file for complete search history.

(56) References Cited

U.S. PATENT DOCUMENTS

| | | | |
|---|---|---|---|
| 6,018,789 | A | 1/2000 | Sokolov et al. |
| 6,065,095 | A | 5/2000 | Sokolov et al. |
| 6,078,452 | A | 6/2000 | Kittilson et al. |
| 6,081,447 | A | 6/2000 | Lofgren et al. |
| 6,092,149 | A | 7/2000 | Hicken et al. |
| 6,092,150 | A | 7/2000 | Sokolov et al. |
| 6,094,707 | A | 7/2000 | Sokolov et al. |
| 6,105,104 | A | 8/2000 | Guttmann et al. |
| 6,111,717 | A | 8/2000 | Cloke et al. |
| 6,145,052 | A | 11/2000 | Howe et al. |
| 6,175,893 | B1 | 1/2001 | D'Souza et al. |
| 6,178,056 | B1 | 1/2001 | Cloke et al. |
| 6,191,909 | B1 | 2/2001 | Cloke et al. |
| 6,195,218 | B1 | 2/2001 | Guttmann et al. |
| 6,205,494 | B1 | 3/2001 | Williams |
| 6,208,477 | B1 | 3/2001 | Cloke et al. |
| 6,223,303 | B1 | 4/2001 | Billings et al. |
| 6,230,233 | B1 | 5/2001 | Lofgren et al. |
| 6,246,346 | B1 | 6/2001 | Cloke et al. |
| 6,249,393 | B1 | 6/2001 | Billings et al. |
| 6,256,695 | B1 | 7/2001 | Williams |
| 6,262,857 | B1 | 7/2001 | Hull et al. |
| 6,263,459 | B1 | 7/2001 | Schibilla |
| 6,272,694 | B1 | 8/2001 | Weaver et al. |
| 6,278,568 | B1 | 8/2001 | Cloke et al. |
| 6,279,089 | B1 | 8/2001 | Schibilla et al. |

(Continued)

*Primary Examiner* — Ali Neyzari

(57) ABSTRACT

Managing data stored in a Data Storage Device (DSD) including at least one disk for storing data. Data is written in a first region of the at least one disk with a first track density. A frequency of access is determined for the data written in the first region, and the frequency of access is compared to a threshold. Based on the comparison, a copy of the data written in the first region is written in a second region of the at least one disk with a second track density different than the first track density.

24 Claims, 6 Drawing Sheets

(56) References Cited

U.S. PATENT DOCUMENTS 6,289,484 B1 9/2001 Rothberg et al.
6,292,912 B1 9/2001 Cloke et al.
6,310,740 B1 10/2001 Dunbar et al.
6,317,850 B1 11/2001 Rothberg
6,327,106 B1 12/2001 Rothberg
6,337,778 B1 1/2002 Gagne
6,369,969 B1 4/2002 Christiansen et al.
6,384,999 B1 5/2002 Schibilla
6,388,833 B1 5/2002 Golowka et al.
6,405,342 B1 6/2002 Lee
6,408,357 B1 6/2002 Hanmann et al.
6,408,406 B1 6/2002 Parris
6,411,452 B1 6/2002 Cloke
6,411,458 B1 6/2002 Billings et al.
6,412,083 B1 6/2002 Rothberg et al.
6,415,349 B1 7/2002 Hull et al.
6,425,128 B1 7/2002 Krapf et al.
6,441,981 B1 8/2002 Cloke et al.
6,442,328 B1 8/2002 Elliott et al.
6,445,524 B1 9/2002 Nazarian et al.
6,449,767 B1 9/2002 Krapf et al.
6,453,115 B1 9/2002 Boyle
6,470,420 B1 10/2002 Hospodor
6,480,020 B1 11/2002 Jung et al.
6,480,349 B1 11/2002 Kim et al.
6,480,932 B1 11/2002 Vallis et al.
6,483,986 B1 11/2002 Krapf
6,487,032 B1 11/2002 Cloke et al.
6,490,635 B1 12/2002 Holmes
6,493,173 B1 12/2002 Kim et al.
6,499,083 B1 12/2002 Hamlin
6,519,104 B1 2/2003 Cloke et al.
6,525,892 B1 2/2003 Dunbar et al.
6,545,830 B1 4/2003 Briggs et al.
6,546,489 B1 4/2003 Frank, Jr. et al.
6,550,021 B1 4/2003 Dalphy et al.
6,552,880 B1 4/2003 Dunbar et al.
6,553,457 B1 4/2003 Wilkins et al.
6,578,106 B1 6/2003 Price
6,580,573 B1 6/2003 Hull et al.
6,594,183 B1 7/2003 Lofgren et al.
6,600,620 B1 7/2003 Krounbi et al.
6,601,137 B1 7/2003 Castro et al.
6,603,622 B1 8/2003 Christiansen et al.
6,603,625 B1 8/2003 Hospodor et al.
6,604,220 B1 8/2003 Lee
6,606,682 B1 8/2003 Dang et al.
6,606,714 B1 8/2003 Thelin
6,606,717 B1 8/2003 Yu et al.
6,611,393 B1 8/2003 Nguyen et al.
6,615,312 B1 9/2003 Hamlin et al.
6,639,748 B1 10/2003 Christiansen et al.
6,647,481 B1 11/2003 Luu et al.
6,654,193 B1 11/2003 Thelin
6,657,810 B1 12/2003 Kupferman
6,661,591 B1 12/2003 Rothberg
6,665,772 B1 12/2003 Hamlin
6,687,073 B1 2/2004 Kupferman
6,687,078 B1 2/2004 Kim
6,687,850 B1 2/2004 Rothberg
6,690,523 B1 2/2004 Nguyen et al.
6,690,882 B1 2/2004 Hanmann et al.
6,691,198 B1 2/2004 Hamlin
6,691,213 B1 2/2004 Luu et al.
6,691,255 B1 2/2004 Rothberg et al.
6,693,760 B1 2/2004 Krounbi et al.
6,694,477 B1 2/2004 Lee
6,697,914 B1 2/2004 Hospodor et al.
6,704,153 B1 3/2004 Rothberg et al.
6,708,251 B1 3/2004 Boyle et al.
6,710,951 B1 3/2004 Cloke
6,711,628 B1 3/2004 Thelin
6,711,635 B1 3/2004 Wang
6,711,660 B1 3/2004 Milne et al.
6,715,044 B2 3/2004 Lofgren et al.
6,724,982 B1 4/2004 Hamlin
6,725,329 B1 4/2004 Ng et al.
6,735,650 B1 5/2004 Rothberg
6,735,693 B1 5/2004 Hamlin
6,744,772 B1 6/2004 Eneboe et al.
6,745,283 B1 6/2004 Dang
6,751,402 B1 6/2004 Elliott et al.
6,757,481 B1 6/2004 Nazarian et al.
6,772,281 B2 8/2004 Hamlin
6,781,826 B1 8/2004 Goldstone et al.
6,782,449 B1 8/2004 Codilian et al.
6,791,779 B1 9/2004 Singh et al.
6,792,486 B1 9/2004 Hanan et al.
6,799,274 B1 9/2004 Hamlin
6,811,427 B2 11/2004 Garrett et al.
6,826,003 B1 11/2004 Subrahmanyam
6,826,614 B1 11/2004 Hanmann et al.
6,832,041 B1 12/2004 Boyle
6,832,929 B2 12/2004 Garrett et al.
6,845,405 B1 1/2005 Thelin
6,845,427 B1 1/2005 Atai-Azimi
6,850,443 B2 2/2005 Lofgren et al.
6,851,055 B1 2/2005 Boyle et al.
6,851,063 B1 2/2005 Boyle et al.
6,853,731 B1 2/2005 Boyle et al.
6,854,022 B1 2/2005 Thelin
6,862,660 B1 3/2005 Wilkins et al.
6,880,043 B1 4/2005 Castro et al.
6,882,486 B1 4/2005 Kupferman
6,884,085 B1 4/2005 Goldstone
6,888,831 B1 5/2005 Hospodor et al.
6,892,217 B1 5/2005 Hanmann et al.
6,892,249 B1 5/2005 Codilian et al.
6,892,313 B1 5/2005 Codilian et al.
6,895,455 B1 5/2005 Rothberg
6,895,500 B1 5/2005 Rothberg
6,898,730 B1 5/2005 Hanan
6,910,099 B1 6/2005 Wang et al.
6,928,470 B1 8/2005 Hamlin
6,931,439 B1 8/2005 Hanmann et al.
6,934,104 B1 8/2005 Kupferman
6,934,713 B2 8/2005 Schwartz et al.
6,940,873 B2 9/2005 Boyle et al.
6,943,978 B1 9/2005 Lee
6,948,165 B1 9/2005 Luu et al.
6,950,267 B1 9/2005 Liu et al.
6,954,733 B1 10/2005 Ellis et al.
6,961,814 B1 11/2005 Thelin et al.
6,965,489 B1 11/2005 Lee et al.
6,965,563 B1 11/2005 Hospodor et al.
6,965,966 B1 11/2005 Rothberg et al.
6,967,799 B1 11/2005 Lee
6,968,422 B1 11/2005 Codilian et al.
6,968,450 B1 11/2005 Rothberg et al.
6,973,495 B1 12/2005 Milne et al.
6,973,570 B1 12/2005 Hamlin
6,976,190 B1 12/2005 Goldstone
6,983,316 B1 1/2006 Milne et al.
6,986,007 B1 1/2006 Procyk et al.
6,986,154 B1 1/2006 Price et al.
6,995,933 B1 2/2006 Codilian et al.
6,996,501 B1 2/2006 Rothberg
6,996,669 B1 2/2006 Dang et al.
7,002,926 B1 2/2006 Eneboe et al.
7,003,674 B1 2/2006 Hamlin
7,006,316 B1 2/2006 Sargenti, Jr. et al.
7,009,820 B1 3/2006 Hogg
7,023,639 B1 4/2006 Kupferman
7,024,491 B1 4/2006 Hanmann et al.
7,024,549 B1 4/2006 Luu et al.
7,024,614 B1 4/2006 Thelin et al.
7,027,716 B1 4/2006 Boyle et al.
7,028,174 B1 4/2006 Atai-Azimi et al.
7,031,902 B1 4/2006 Catiller
7,046,465 B1 5/2006 Kupferman
7,046,488 B1 5/2006 Hogg
7,050,252 B1 5/2006 Vallis
7,054,937 B1 5/2006 Milne et al.
7,055,000 B1 5/2006 Severtson

(56) References Cited

U.S. PATENT DOCUMENTS 7,055,167 B1 5/2006 Masters
7,057,836 B1 6/2006 Kupferman
7,062,398 B1 6/2006 Rothberg
7,075,746 B1 7/2006 Kupferman
7,076,604 B1 7/2006 Thelin
7,082,494 B1 7/2006 Thelin et al.
7,088,538 B1 8/2006 Codilian et al.
7,088,545 B1 8/2006 Singh et al.
7,092,186 B1 8/2006 Hogg
7,095,577 B1 8/2006 Codilian et al.
7,099,095 B1 8/2006 Subrahmanyam et al.
7,106,537 B1 9/2006 Bennett
7,106,947 B2 9/2006 Boyle et al.
7,110,202 B1 9/2006 Vasquez
7,111,116 B1 9/2006 Boyle et al.
7,114,029 B1 9/2006 Thelin
7,120,737 B1 10/2006 Thelin
7,120,806 B1 10/2006 Codilian et al.
7,126,776 B1 10/2006 Warren, Jr. et al.
7,129,763 B1 10/2006 Bennett et al.
7,133,600 B1 11/2006 Boyle
7,136,244 B1 11/2006 Rothberg
7,146,094 B1 12/2006 Boyle
7,149,046 B1 12/2006 Coker et al.
7,150,036 B1 12/2006 Milne et al.
7,155,616 B1 12/2006 Hamlin
7,171,108 B1 1/2007 Masters et al.
7,171,110 B1 1/2007 Wilshire
7,184,241 B1 * 2/2007 Mallary et al. ............ 360/78.04
7,194,576 B1 3/2007 Boyle
7,200,698 B1 4/2007 Rothberg
7,205,805 B1 4/2007 Bennett
7,206,497 B1 4/2007 Boyle et al.
7,215,496 B1 5/2007 Kupferman et al.
7,215,771 B1 5/2007 Hamlin
7,237,054 B1 6/2007 Cain et al.
7,240,161 B1 7/2007 Boyle
7,249,365 B1 7/2007 Price et al.
7,263,709 B1 8/2007 Krapf
7,274,639 B1 9/2007 Codilian et al.
7,274,659 B2 9/2007 Hospodor
7,275,116 B1 9/2007 Hanmann et al.
7,280,302 B1 10/2007 Masiewicz
7,292,774 B1 11/2007 Masters et al.
7,292,775 B1 11/2007 Boyle et al.
7,296,284 B1 11/2007 Price et al.
7,302,501 B1 11/2007 Cain et al.
7,302,579 B1 11/2007 Cain et al.
7,318,088 B1 1/2008 Mann
7,319,806 B1 1/2008 Willner et al.
7,325,244 B2 1/2008 Boyle et al.
7,330,323 B1 2/2008 Singh et al.
7,346,790 B1 3/2008 Klein
7,366,641 B1 4/2008 Masiewicz et al.
7,369,340 B1 5/2008 Dang et al.
7,369,343 B1 5/2008 Yeo et al.
7,372,650 B1 5/2008 Kupferman
7,380,147 B1 5/2008 Sun
7,392,340 B1 6/2008 Dang et al.
7,404,013 B1 7/2008 Masiewicz
7,406,545 B1 7/2008 Rothberg et al.
7,415,571 B1 8/2008 Hanan
7,417,821 B2 8/2008 Tsuchinaga
7,436,610 B1 10/2008 Thelin
7,437,502 B1 10/2008 Coker
7,440,214 B1 10/2008 Ell et al.
7,451,344 B1 11/2008 Rothberg
7,471,483 B1 12/2008 Ferris et al.
7,471,486 B1 12/2008 Coker et al.
7,486,060 B1 2/2009 Bennett
7,496,493 B1 2/2009 Stevens
7,518,819 B1 4/2009 Yu et al.
7,526,184 B1 4/2009 Parkinen et al.
7,539,924 B1 5/2009 Vasquez et al.
7,543,117 B1 6/2009 Hanan
7,549,021 B2 6/2009 Warren, Jr.
7,551,383 B1 6/2009 Kupferman
7,562,282 B1 7/2009 Rothberg
7,577,973 B1 8/2009 Kapner, III et al.
7,596,797 B1 9/2009 Kapner, III et al.
7,599,139 B1 10/2009 Bombet et al.
7,617,358 B1 11/2009 Liikanen et al.
7,619,841 B1 11/2009 Kupferman
7,620,772 B1 11/2009 Liikanen et al.
7,647,544 B1 1/2010 Masiewicz
7,649,704 B1 1/2010 Bombet et al.
7,653,847 B1 1/2010 Liikanen et al.
7,653,927 B1 1/2010 Kapner, III et al.
7,656,603 B1 2/2010 Xing
7,656,763 B1 2/2010 Jin et al.
7,657,149 B2 2/2010 Boyle
7,672,072 B1 3/2010 Boyle et al.
7,673,075 B1 3/2010 Masiewicz
7,685,360 B1 3/2010 Brunnett et al.
7,688,540 B1 3/2010 Mei et al.
7,724,461 B1 5/2010 McFadyen et al.
7,725,584 B1 5/2010 Hanmann et al.
7,730,295 B1 6/2010 Lee
7,747,810 B2 6/2010 Uemura et al.
7,760,458 B1 7/2010 Trinh
7,768,776 B1 8/2010 Szeremeta et al.
7,804,657 B1 9/2010 Hogg et al.
7,813,954 B1 10/2010 Price et al.
7,827,320 B1 11/2010 Stevens
7,839,588 B1 11/2010 Dang et al.
7,843,660 B1 11/2010 Yeo
7,852,596 B2 12/2010 Boyle et al.
7,859,782 B1 12/2010 Lee
7,864,476 B2 1/2011 Ehrlich
7,872,822 B1 1/2011 Rothberg
7,898,756 B1 3/2011 Wang
7,898,762 B1 3/2011 Guo et al.
7,900,037 B1 3/2011 Fallone et al.
7,907,364 B2 3/2011 Boyle et al.
7,929,234 B1 4/2011 Boyle et al.
7,933,087 B1 4/2011 Tsai et al.
7,933,090 B1 4/2011 Jung et al.
7,934,030 B1 4/2011 Sargenti, Jr. et al.
7,940,491 B2 5/2011 Szeremeta et al.
7,944,639 B1 5/2011 Wang
7,945,727 B2 5/2011 Rothberg et al.
7,949,564 B1 5/2011 Hughes et al.
7,974,029 B2 7/2011 Tsai et al.
7,974,039 B1 7/2011 Xu et al.
7,982,993 B1 7/2011 Tsai et al.
7,982,994 B1 7/2011 Erden et al.
7,984,200 B1 7/2011 Bombet et al.
7,990,648 B1 8/2011 Wang
7,992,179 B1 8/2011 Kapner, III et al.
8,004,785 B1 8/2011 Tsai et al.
8,006,027 B1 8/2011 Stevens et al.
8,014,094 B1 9/2011 Jin
8,014,977 B1 9/2011 Masiewicz et al.
8,019,914 B1 9/2011 Vasquez et al.
8,040,625 B1 10/2011 Boyle et al.
8,078,943 B1 12/2011 Lee
8,079,045 B2 12/2011 Krapf et al.
8,082,433 B1 12/2011 Fallone et al.
8,085,487 B1 12/2011 Jung et al.
8,089,719 B1 1/2012 Dakroub
8,090,902 B1 1/2012 Bennett et al.
8,090,906 B1 1/2012 Blaha et al.
8,091,112 B1 1/2012 Elliott et al.
8,094,396 B1 1/2012 Zhang et al.
8,094,401 B1 1/2012 Peng et al.
8,116,020 B1 2/2012 Lee
8,116,025 B1 2/2012 Chan et al.
8,134,793 B1 3/2012 Vasquez et al.
8,134,798 B1 3/2012 Thelin et al.
8,139,301 B1 3/2012 Li et al.
8,139,310 B1 3/2012 Hogg
8,144,419 B1 3/2012 Liu
8,145,452 B1 3/2012 Masiewicz et al.
8,149,528 B1 4/2012 Suratman et al.

(56) References Cited

U.S. PATENT DOCUMENTS 8,154,812 B1 4/2012 Boyle et al.
8,159,768 B1 4/2012 Miyamura
8,161,328 B1 4/2012 Wilshire
8,164,849 B1 4/2012 Szeremeta et al.
8,174,780 B1 5/2012 Tsai et al.
8,190,575 B1 5/2012 Ong et al.
8,194,338 B1 6/2012 Zhang
8,194,340 B1 6/2012 Boyle et al.
8,194,341 B1 6/2012 Boyle
8,201,066 B1 6/2012 Wang
8,271,692 B1 9/2012 Dinh et al.
8,279,550 B1 10/2012 Hogg
8,281,218 B1 10/2012 Ybarra et al.
8,285,923 B2 10/2012 Stevens
8,289,656 B1 10/2012 Huber
8,305,705 B1 11/2012 Roohr
8,307,156 B1 11/2012 Codilian et al.
8,310,775 B1 11/2012 Boguslawski et al.
8,315,006 B1 11/2012 Chahwan et al.
8,316,263 B1 11/2012 Gough et al.
8,320,067 B1 11/2012 Tsai et al.
8,324,974 B1 12/2012 Bennett
8,332,695 B2 12/2012 Dalphy et al.
8,341,337 B1 12/2012 Ong et al.
8,350,628 B1 1/2013 Bennett
8,356,184 B1 1/2013 Meyer et al.
8,370,683 B1 2/2013 Ryan et al.
8,375,225 B1 2/2013 Ybarra
8,375,274 B1 2/2013 Bonke
8,380,922 B1 2/2013 DeForest et al.
8,390,948 B2 3/2013 Hogg
8,390,952 B1 3/2013 Szeremeta
8,392,689 B1 3/2013 Lott
8,407,393 B1 3/2013 Yolar et al.
8,413,010 B1 4/2013 Vasquez et al.
8,417,566 B2 4/2013 Price et al.
8,421,663 B1 4/2013 Bennett
8,422,172 B1 4/2013 Dakroub et al.
8,427,771 B1 4/2013 Tsai
8,429,343 B1 4/2013 Tsai
8,433,937 B1 4/2013 Wheelock et al.
8,433,977 B1 4/2013 Vasquez et al.
8,458,526 B2 6/2013 Dalphy et al.
8,462,466 B2 6/2013 Huber
8,467,151 B1 6/2013 Huber
8,489,841 B1 7/2013 Strecke et al.
8,493,679 B1 7/2013 Boguslawski et al.
8,498,074 B1 7/2013 Mobley et al.
8,499,198 B1 7/2013 Messenger et al.
8,512,049 B1 8/2013 Huber et al.
8,514,506 B1 8/2013 Li et al.
8,531,791 B1 9/2013 Reid et al.
8,554,741 B1 10/2013 Malina
8,560,759 B1 10/2013 Boyle et al.
8,565,053 B1 10/2013 Chung
8,576,511 B1 11/2013 Coker et al.
8,578,100 B1 11/2013 Huynh et al.
8,578,242 B1 11/2013 Burton et al.
8,589,773 B1 11/2013 Wang et al.
8,593,753 B1 11/2013 Anderson
8,595,432 B1 11/2013 Vinson et al.
8,599,510 B1 12/2013 Fallone
8,601,248 B2 12/2013 Thorsted
8,611,032 B2 12/2013 Champion et al.
8,612,650 B1 12/2013 Carrie et al.
8,612,706 B1 12/2013 Madril et al.
8,612,798 B1 12/2013 Tsai
8,619,383 B1 12/2013 Jung et al.
8,621,115 B1 12/2013 Bombet et al.
8,621,133 B1 12/2013 Boyle
8,626,463 B2 1/2014 Stevens et al.
8,630,052 B1 1/2014 Jung et al.
8,630,056 B1 1/2014 Ong
8,631,188 B1 1/2014 Heath et al.
8,634,158 B1 1/2014 Chahwan et al.
8,635,412 B1 1/2014 Wilshire
8,640,007 B1 1/2014 Schulze
8,654,619 B1 2/2014 Cheng
8,661,193 B1 2/2014 Cobos et al.
8,667,248 B1 3/2014 Neppalli
8,670,205 B1 3/2014 Malina et al.
8,683,295 B1 3/2014 Syu et al.
8,683,457 B1 3/2014 Hughes et al.
8,687,306 B1 4/2014 Coker et al.
8,693,133 B1 4/2014 Lee et al.
8,694,841 B1 4/2014 Chung et al.
8,699,159 B1 4/2014 Malina
8,699,171 B1 4/2014 Boyle
8,699,172 B1 4/2014 Gunderson et al.
8,699,175 B1 4/2014 Olds et al.
8,699,185 B1 4/2014 Teh et al.
8,700,850 B1 4/2014 Lalouette
8,743,502 B1 6/2014 Bonke et al.
8,749,910 B1 6/2014 Dang et al.
8,751,699 B1 6/2014 Tsai et al.
8,755,141 B1 6/2014 Dang
8,755,143 B2 6/2014 Wilson et al.
8,756,361 B1 6/2014 Carlson et al.
8,756,382 B1 6/2014 Carlson et al.
8,769,593 B1 7/2014 Schwartz et al.
8,773,802 B1 7/2014 Anderson et al.
8,780,478 B1 7/2014 Huynh et al.
8,782,334 B1 7/2014 Boyle et al.
8,793,532 B1 7/2014 Tsai et al.
8,797,669 B1 8/2014 Burton
8,799,977 B1 8/2014 Kapner, III et al.
8,819,375 B1 8/2014 Pruett et al.
8,825,976 B1 9/2014 Jones
8,825,977 B1 9/2014 Syu et al.
2002/0186492 A1 12/2002 Smith
2005/0069298 A1 3/2005 Kasiraj et al.
2005/0248867 A1 11/2005 Choi
2006/0253621 A1 11/2006 Brewer et al.
2007/0186029 A1 8/2007 Uemura et al.
2007/0223132 A1 9/2007 Tsuchinaga
2008/0239552 A1 10/2008 Kimura
2009/0113702 A1 5/2009 Hogg
2009/0259819 A1 10/2009 Chen et al.
2010/0030987 A1 2/2010 Na et al.
2010/0306551 A1 12/2010 Meyer et al.
2011/0226729 A1 9/2011 Hogg
2011/0292538 A1 12/2011 Haga et al.
2011/0304939 A1 12/2011 Hirata et al.
2012/0159042 A1 6/2012 Lott et al.
2012/0275050 A1 11/2012 Wilson et al.
2012/0281963 A1 11/2012 Krapf et al.
2012/0303873 A1 11/2012 Nguyen et al.
2012/0324980 A1 12/2012 Nguyen et al.
2013/0145223 A1 6/2013 Okada et al.
2014/0201424 A1 7/2014 Chen et al.

* cited by examiner

ITIC Operation

Refresh Operation

DATA MANAGEMENT FOR DATA STORAGE DEVICE WITH DIFFERENT TRACK DENSITY REGIONS

BACKGROUND

Data Storage Devices (DSDs) are often used to record data on or to reproduce data from a recording media. As one type of DSD, a disk drive can include a rotating magnetic disk and a head actuated over the disk to magnetically write data to and read data from the disk. Such disks include a plurality of radially spaced, concentric tracks for recording data.

Shingled Magnetic Recording (SMR) has been introduced as a way of increasing the amount of data that can be stored in a given area on a disk by increasing the number of Tracks Per Inch (TPI). SMR increases TPI by using a relatively wide shingle write head to overlap tracks like roof shingles. The non-overlapping portion then serves as a narrow track that can be read by a narrower read head.

Although a higher number of TPI is ordinarily possible with SMR, the higher track density can create additional problems. For example, the closer spacing of tracks in an SMR region can worsen Adjacent Track Interference (ATI) where the writing of data on an adjacent track negatively affects the data written on a target track. One way of approaching this problem includes Inter-Track Interference Cancellation (ITIC) where data is read in the adjacent track to account for its effect in the target track. However, since ITIC typically involves additional reading and accounting for data in the adjacent track, more processing resources are usually consumed in addition to either the additional time to read the adjacent track or the additional cost of providing an extra read head to read the data in the adjacent track.

Another problem encountered with SMR involves Wide Area Track Erasure (WATER). WATER results in data being erased from adjacent tracks near a track being written due to interference from the magnetic field of the write head. The problems caused by WATER are exacerbated when tracks are repeatedly rewritten. DSDs using SMR are ordinarily more susceptible to WATER than conventional disk drives due to the combination of narrower tracks and a wider shingle write head having a stronger magnetic field.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
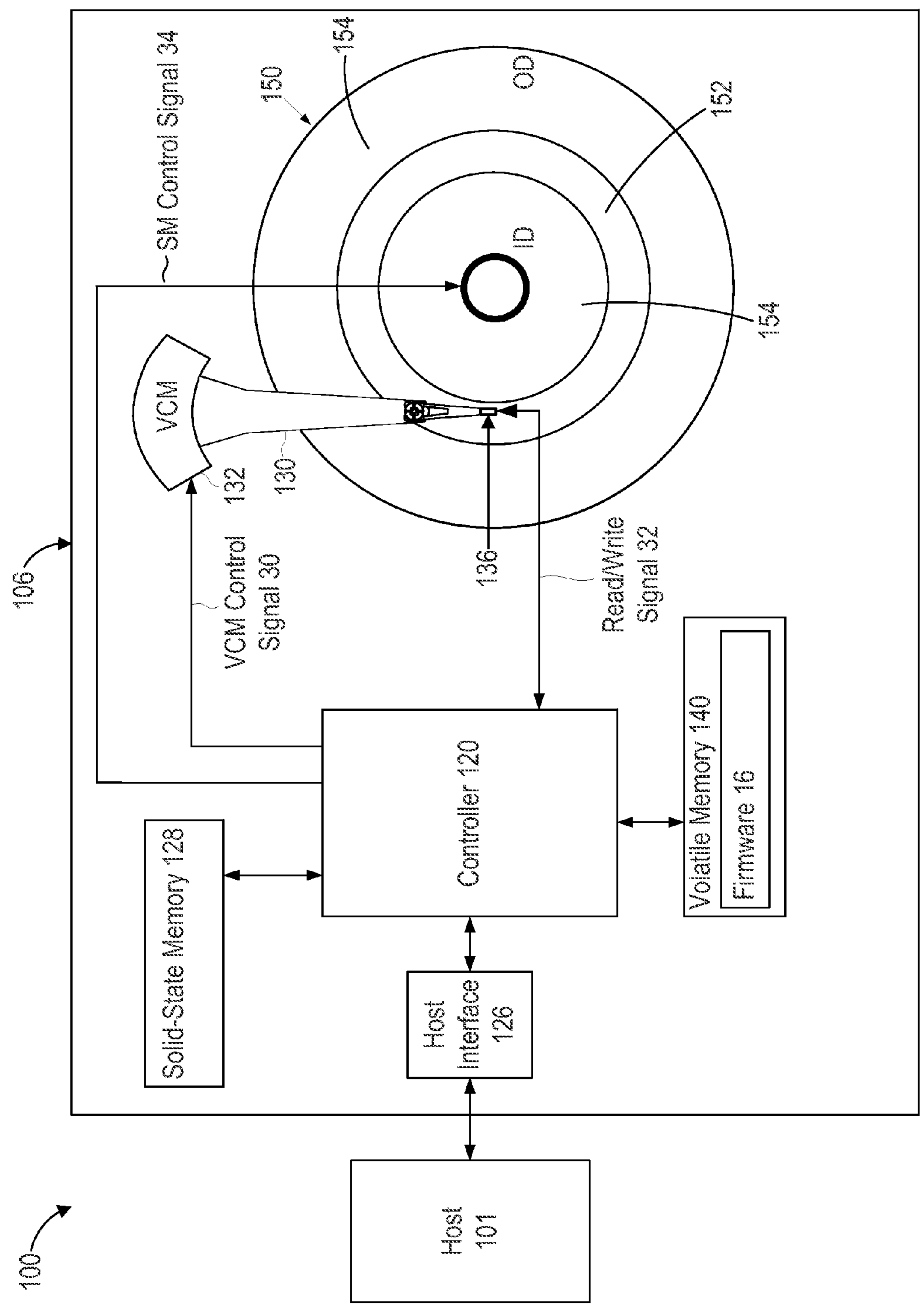
FIG. 1 is a block diagram depicting a Data Storage Device (DSD) according to an embodiment.

FIG. 1 shows system 100 according to an embodiment that includes host 101 and Data Storage Device (DSD) 106. System 100 can be, for example, a computer system (e.g., server, desktop, mobile/laptop, tablet, smartphone, etc.) or other electronic device such as a digital video recorder (DVR). In this regard, system 100 may be a stand-alone system or part of a network. Those of ordinary skill in the art will appreciate that system 100 and DSD 106 can include more or less than those elements shown in FIG. 1 and that the disclosed processes can be implemented in other environments.

In the example embodiment of FIG. 1, DSD 106 includes both solid-state memory 128 and disk 150 for storing data. In this regard, DSD 106 can be considered a Solid-State Hybrid Drive (SSHD) in that it includes both solid-state Non-Volatile Memory (NVM) media and disk NVM media. In other embodiments, each of disk 150 or solid-state memory 128 may be replaced by multiple Hard Disk Drives (HDDs) or multiple Solid-State Drives (SSDs), respectively, so that DSD 106 includes pools of HDDs or SSDs. In yet other embodiments, DSD 106 may include disk 150 without solid-state memory 128.

DSD 106 includes controller 120 which comprises circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host 101 and may interface according to a standard such as, for example, PCI express (PCIe), Serial Advanced Technology Attachment (SATA), or Serial Attached SCSI (SAS). Host 101 may include an interface on its end for communicating with DSD 106. As will be appreciated by those of ordinary skill in the art, host interface 126 can be included as part of controller 120.

In the example of FIG. 1, disk 150 is rotated by a spindle motor (not shown). DSD 106 also includes head 136 connected to the distal end of actuator 130, which is rotated by Voice Coil Motor (VCM) 132 to position head 136 in relation to disk 150. Controller 120 can control the position of head 136 and the rotation of disk 150 using VCM control signal 30 and SM control signal 34, respectively.

As appreciated by those of ordinary skill in the art, disk 150 may form part of a disk pack with additional disks radially aligned below disk 150. In addition, head 136 may form part of a head stack assembly including additional heads with each head arranged to read data from and write data to a corresponding surface of a disk in a disk pack.

Disk 150 includes a number of radial spaced, concentric tracks (not shown) for storing data on a surface of disk 150. The tracks on disk 150 may be grouped together into zones of tracks with each track divided into a number of sectors that are spaced circumferentially along the tracks.

As shown in the example of FIG. 1, disk 150 includes first region 152 with a first track density and second region 154 with a second track density. In some implementations, such as those discussed below with reference to FIG. 3, the first track density in first region 152 is less than the second track density in second region 154 such that the centers of tracks in second region 154 are closer together and can store more data in a given area of disk 150. In such implementations, second region 154 may be written using Shingled Magnetic Recording (SMR) such that the tracks in second region 154 overlap, while first region 152 can be written using Conventional Magnetic Recording (CMR) such that the tracks in first region 152 do not overlap. In other implementations where second region 154 has a higher track density, the tracks in both first region 152 and second region 154 may be written using SMR or CMR, but with a higher track density in second region 154.

In other implementations, the first track density in first region 152 is less than the second track density in second region 154 such that the centers of tracks in second region 154 are farther apart and can store less data in a given area of disk 150. In one such implementation, the tracks in first region 152 can be written using SMR with overlapping tracks while the tracks written in second region 154 are written using CMR with non-overlapping tracks. In other implementations where first region 152 has a higher track density, the tracks in both first region 152 and second region 154 may be written using SMR or CMR, but with a higher track density in first region 152.

The example embodiment of FIG. 1 depicts first region 152 in a Middle Diameter (MD) portion of disk 150. In this regard, a region with a lower track density may be located in an MD portion since locating a higher track density region in other portions of disk 150, such as an Outer Diameter (OD) or Inner Diameter (ID) portion, can result in an increased data capacity than locating the higher track density region in an MD portion. In other embodiments, first region 152 and second region 154 may be located in other portions of disk 150 or may have different relative areas on disk 150.

The regions with different track densities may be contiguous regions or may include non-contiguous regions as in the example of FIG. 1, where second region 154 is located on both sides of first region 152. In addition, disk 150 is shown in FIG. 1 as having two regions with different track densities, however, other embodiments may include a different number of regions with different track densities.

In addition to disk 150, the NVM media of DSD 106 also includes solid-state memory 128 for storing data. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (FeRAM), Magnetoresistive RAM (MRAM), other discrete NVM chips, or any combination thereof.

In FIG. 1, volatile memory 140 can include, for example, a Dynamic Random Access Memory (DRAM), which can be used by DSD 106 to temporarily store data. Data stored in volatile memory 140 can include data read from NVM media (e.g., disk 150 or solid-state memory 128), data to be written to NVM media, instructions loaded from firmware 16 for execution by controller 120, or data used in executing firmware 16. In this regard, volatile memory 140 in FIG. 1 is shown as temporarily storing firmware 16 which can include instructions for execution by controller 120 to implement the data management processes discussed below.

In operation, host interface 126 receives read and write commands from host 101 via host interface 126 for reading data from and writing data to the NVM media of DSD 106. In response to a write command from host 101, controller 120 may buffer the data to be written for the write command in volatile memory 140.

For data to be stored in solid-state memory 128, controller 120 receives data from host interface 126 and may buffer the data in volatile memory 140. In one implementation, the data is then encoded into charge values for charging cells (not shown) of solid-state memory 128 to store the data.

In response to a read command for data stored in solid-state memory 128, controller 120 in one implementation reads current values for cells in solid-state memory 128 and decodes the current values into data that can be transferred to host 101. Such data may be buffered by controller 120 before transferring the data to host 101 via host interface 126.

For data to be written to disk 150, controller 120 can encode the buffered data into write signal 32 which is provided to head 136 for magnetically writing data to the surface of disk 150.

In response to a read command for data stored on disk 150, controller 120 positions head 136 via VCM control signal 30 to magnetically read the data stored on the surface of disk 150. Head 136 sends the read data as read signal 32 to controller 120 for decoding, and the data is buffered in volatile memory 140 for transferring to host 101.

Data Management Examples

Figure 2:
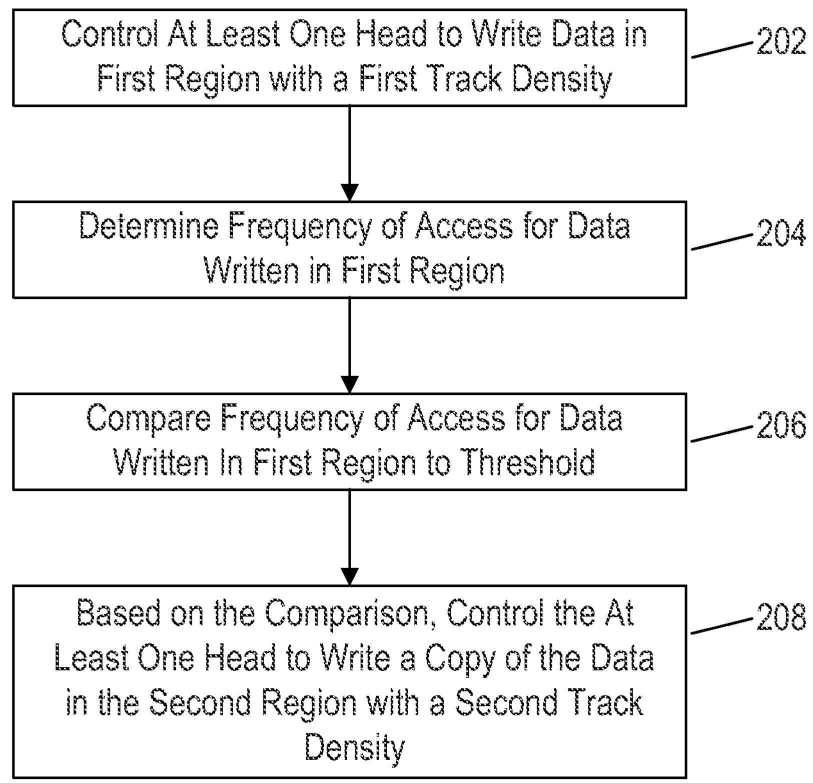
FIG. 2 is a flowchart for a data management process according to an embodiment.

FIG. 2 is a flowchart for a data management process that can be performed by controller 120 executing firmware 16 according to an embodiment. In other embodiments, the process of FIG. 2 can be performed by a processor of host 101 using, for example, a driver or other application executed by host 101, or a logical partitioning of DSD 106. As discussed in more detail below, the process of FIG. 2 allows for data to be copied to a region with a different track density based on the frequency of access of the data.

In block 202, controller 120 controls head 136 to write data in first region 152 with a first track density. The writing of data can be, for example, in response to a host write command received via host interface 126 to write data in a NVM of DSD 106. In other examples, the data may be written in first region 152 as part of a maintenance operation of DSD 106 such as a garbage collection operation where data is relocated from one portion of NVM to another.

In block 204, a frequency of access is determined for the data written in first region 152. The frequency of access can be based on a number of previous read commands to access the data and/or a number of previous write commands to modify the data. In some implementations, host 101 may provide an indication through hinting or assigning a priority to data as to the frequency of access for the data. In other implementations, controller 120 may maintain a table or history of previous read or write commands for particular data so as to determine a frequency of access in block 204.

In block 206, controller 120 compares the frequency of access to a threshold. The threshold may include a total number of accesses or a number of accesses within a predetermined time period. The threshold can be set based on considerations such as, for example, the amount of data capacity available in first region 152 or second region 154 or data usage patterns of DSD 106.

In block 208, controller 120 controls head 136 to write a copy of the data in first region 152 in second region 154 with a track density different than the first track density. As discussed in more detail below with reference to FIGS. 3 and 5, the second track density may be greater or less than the first track density.

In general, more frequently accessed data can be stored in a region with a lower track density to ordinarily avoid additional operations or problems that may be encountered when using a higher track density. In contrast, less frequently accessed data can be stored in a region with a higher track density so as to take advantage of the greater space savings in terms of aerial density of disk 150 that is offered by the higher track density, while reducing the overall cost in performance by storing the more frequently accessed data in a region with a lower track density.

Figure 3:
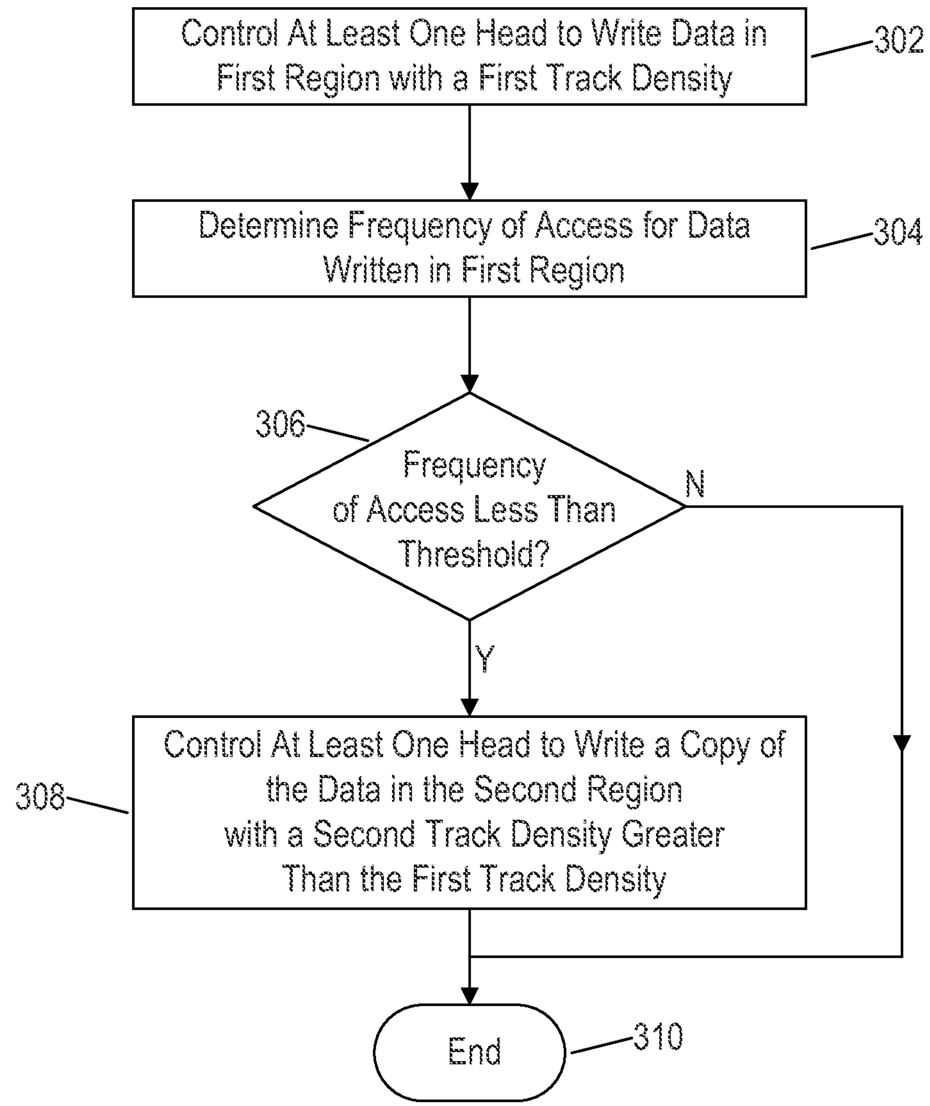
FIG. 3 is a flowchart for a data management process where less frequently accessed data is copied from a region of lower track density to a region of greater track density according to an embodiment.

FIG. 3 is a flowchart for a data management process that can be performed by controller 120 executing firmware 16 where second region 154 has a greater track density than first region 152 according to an embodiment. In other embodiments, the process of FIG. 3 can be performed by a processor of host 101 using, for example, a driver or other application executed by host 101, or a logical partitioning of DSD 106.

In block 302, controller 120 controls head 136 to write data in first region 152 with a first track density that is lower than a second track density of second region 154. As with the process of FIG. 2 discussed above, the writing of data can be in response to a host write command or as part of a maintenance operation of DSD 106.

In block 304, controller 120 determines a frequency of access for the data written in first region 152. As with the process of FIG. 2, the frequency of access can be based on a number of previous read commands to access the data and/or a number of previous write commands to modify the data. Controller 120 may determine the frequency of access based on learning on the part of DSD 106 or based on information provided by host 101.

In block 306, controller 120 determines whether the frequency of access is less than the threshold. This can include determining whether a previous number of write accesses or read accesses have reached a particular threshold number of read or write accesses. In other examples, the frequency of access may be expressed as an average number of accesses in a given amount of time such as three accesses per day. If the frequency of access is not less than the threshold in block 306, the process of FIG. 3 ends in block 310.

On the other hand, if the frequency of access is less than the threshold in block 306, controller 120 controls head 136 in block 308 to write a copy of the data in second region 154 with a track density greater than the first track density. The process of FIG. 3 ends in block 310.

In one implementation, the data stored in first region 152 may be invalidated after copying the data to second region 154 to free up space in first region 152. In other implementations, the data stored in first region 152 may be kept as a backup copy. In this regard, copied data in block 308 may be considered cached, relocated or migrated into second region 154.

Figure 4A:
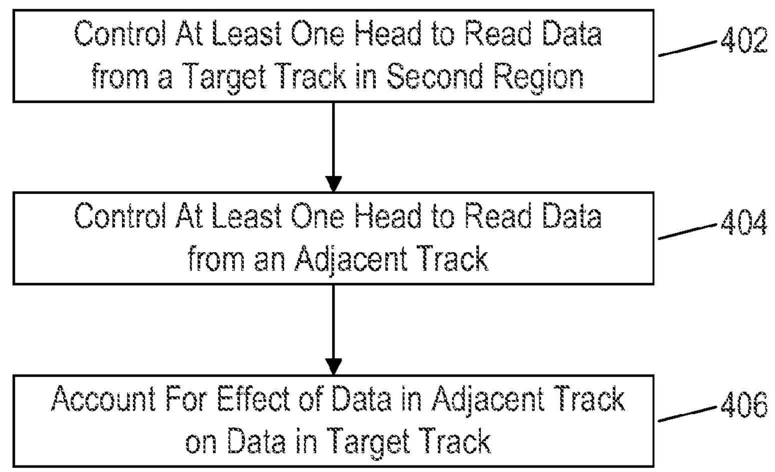
FIG. 4A is a flowchart for an Inter-Track Interference Cancellation (ITIC) operation according to an embodiment.
Figure 4B:
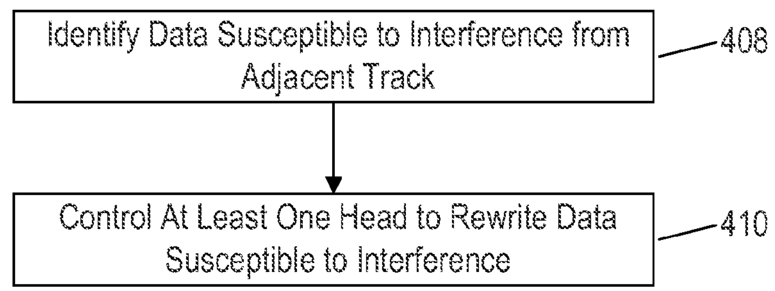
FIG. 4B is a flowchart for a refresh operation according to an embodiment.

By not storing frequently accessed data in a region with a greater track density, it is ordinarily possible to reduce the performance impact and consumption of resources involved with accessing data in a region where data is recorded with a higher track density. FIGS. 4A and 4B illustrate two example operations that may be performed more frequently in a region with a higher track density than in a region with a lower track density.

FIG. 4A is a flowchart for an example of an Inter-Track Interference Cancellation (ITIC) operation that can be performed by controller 120 executing firmware 16 according to an embodiment. Controller 120 may be configured to perform the flowchart of FIG. 4A on its own, or in response to a command from host 101. An ITIC operation may need to be performed in cases where a high track density causes the data on an adjacent track to affect data being read on a target track. The refresh operation of FIG. 4A may be triggered on an as-needed basis by errors encountered when reading data or the operation of FIG. 4A may be continually performed as part of reading data in a region with a higher track density. In some embodiments, the ITIC operation may be performed as part of a Two Dimensional Magnetic Recording (TDMR) implementation where multiple read heads are used in head 136 to account for interference when reading data from narrow tracks.

In block 402 of FIG. 4A, controller 120 controls head 136 to read data from a target track. The data in the target track may have been requested in a read command from host 101 or may be read as part of a maintenance operation of DSD 106.

In block 404, controller 120 controls head 136 to read data from a track adjacent to the target track. In a TDMR implementation, this may be performed by reading the data in the target track and the adjacent track at approximately the same time such that blocks 402 and 404 are performed within a single revolution of disk 150. In other implementations, head 136 may read the data from the adjacent track before or after reading the data from the target track during a different revolution of disk 150. In some embodiments, head 136 may read data from two adjacent tracks to account for the effect of data on both sides of the target track.

In yet other embodiments, head 136 may instead re-read the data in the target track without reading data in an adjacent track in block 404. In such embodiments, the target track may be re-read during a subsequent revolution of disk 150 or head 136 may include two read heads arranged in series to provide two read signals from the target track that may be used to reduce the effect of data from an adjacent track.

In block 406, controller 120 accounts for the effect of data in the adjacent track on the data read in the target track. This can be performed, for example, by comparing the data read in the adjacent track with the data read in the target track for a given position along the target track.

As noted above, the ITIC operation of FIG. 4A or similar ITIC operations can typically be performed less in a region with a lower track density. In some embodiments, the ITIC operation may not be performed at all in the region with a lower track density. By storing more frequently accessed data in the region with a lower track density, it is ordinarily possible to conserve processing resources or improve an average time for performing read commands, while still providing for a greater data storage capacity with the region having a higher track density.

FIG. 4B is a flowchart for a refresh operation that can be performed by controller 120 executing firmware 16 according to an embodiment. Controller 120 may be configured to perform the flowchart of FIG. 4B on its own, or in response to a command from host 101. The refresh operation can be performed to help ensure that data is not corrupted due to repeated writing in a particular area of disk 150.

In block 408, controller 120 identifies data that is susceptible to interference from an adjacent track. This can be performed by identifying an area of disk 150, such as a particular track, that has been written to more than a predetermined amount of times. The predetermined number of writes may be set differently for different regions of disk 150 having different track densities. A region with a high track density that is more prone to having data affected by writes in adjacent tracks can have a lower number of predetermined writes in an adjacent track before triggering the refresh operation of FIG. 4B. In contrast, a region with a lower track density can have a higher number of predetermined writes in an adjacent track before triggering the refresh operation of FIG. 4B.

In block 410, controller 120 controls head 136 to rewrite the data identified in block 408 to protect the data from being corrupted by further adjacent writes. The data may be rewritten in the same location on disk 150 or it may be rewritten in a different location.

As with the ITIC operation of FIG. 4A, the refresh operation of FIG. 4B can be performed less, if at all, in a region of lower track density. Storing frequently accessed data in a region with a lower track density therefore conserves the resources of DSD 106 so that data does not need to be rewritten as frequently as in a region with a higher track density.

Figure 5:
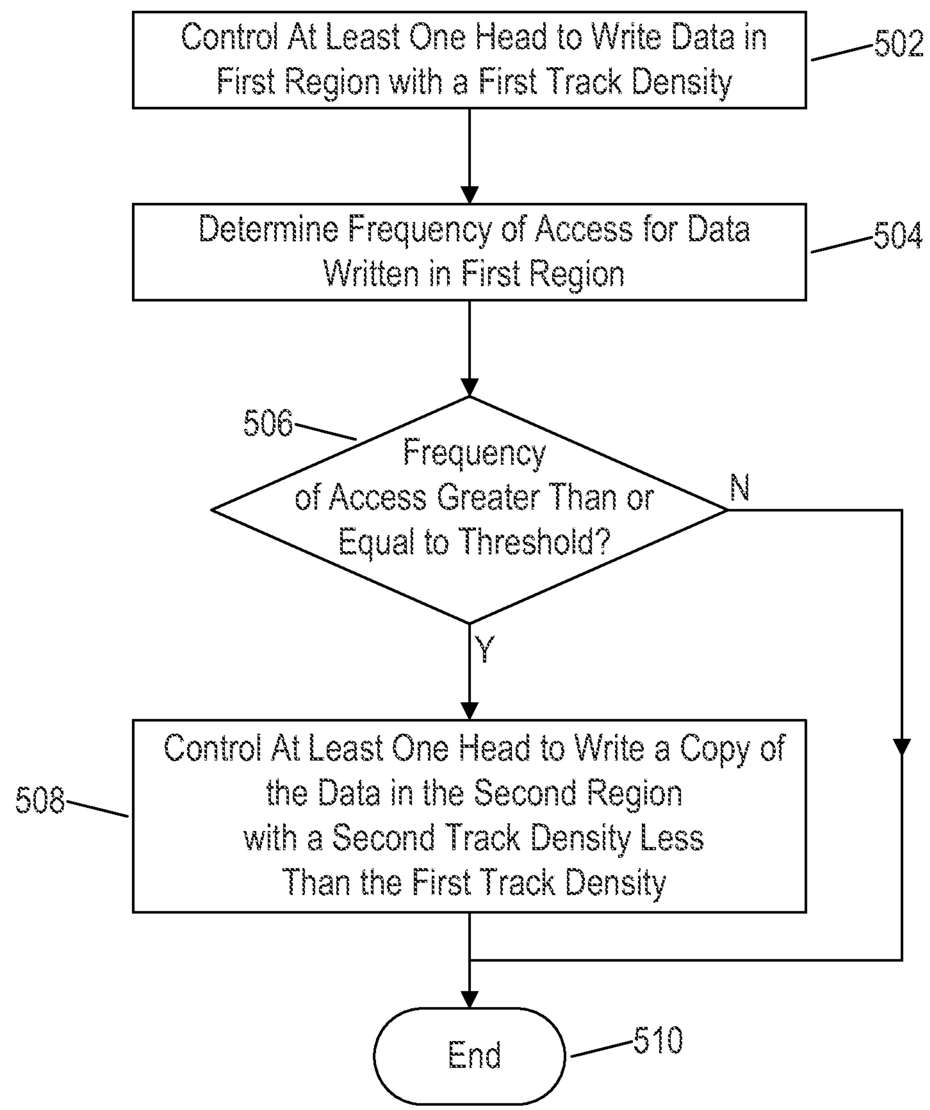
FIG. 5 is a flowchart for a data management process where frequently accessed data is copied from a region of higher track density to a region of lower track density according to an embodiment.

FIG. 5 is a flowchart for a data management process that can be performed by controller 120 where frequently accessed data is copied from a region of higher track density to a region of lower track density according to an embodiment. In other embodiments, the process of FIG. 5 can be performed by a processor of host 101 using, for example, a driver or other application executed by host 101, or a logical partitioning of DSD 106.

In block 502, controller 120 controls head 136 to write data in first region 152 with a first track density that is higher than a second track density of second region 154.

In block 504, controller 120 determines a frequency of access for the data written in block 502. The frequency of access can be based on a number of previous read commands to access the data and/or a number of previous write commands to modify the data. In some implementations, host 101 may provide an indication through hinting or assigning a priority to data as to the frequency of access for the data. In other implementations, controller 120 may maintain a table or history of previous read or write commands for particular data so as to determine a frequency of access in block 504.

In block 506, controller 120 compares the frequency of access to a threshold. The threshold may include a total number of accesses or a number of accesses within a predetermined time period. The threshold can be set based on design considerations such as, for example, the amount of data capacity available in first region 152 or second region 154, or data usage patterns of DSD 106.

In block 508, controller 120 controls head 136 to write a copy of the data in first region 152 in second region 154 with a track density less than the first track density. In the example of FIG. 5, data is first written to a region of higher track density and is then relocated or copied to a region of lower track density if the data is frequently accessed. The data left in first region 152 may then be invalidated so that it can be overwritten or the data may be kept in first region 152 as a backup copy. In this regard, copied data in block 508 may be considered cached, relocated or migrated into second region 154.

Figure 6:
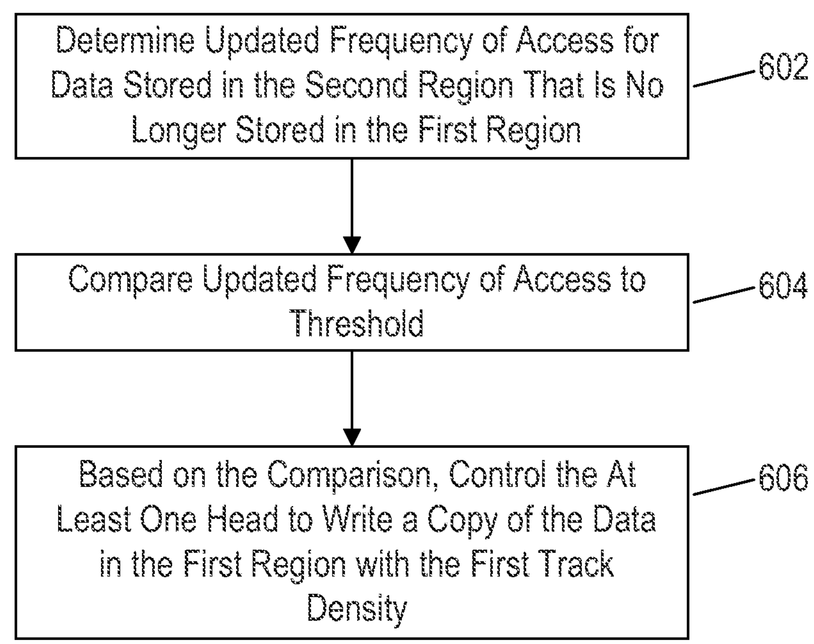
FIG. 6 is a flowchart for a data management process where data is copied from a second region back to a first region based on an updated frequency of access according to an embodiment.

FIG. 6 is a flowchart for a data management process that can be performed by controller 120 where data is copied from second region 154 back to first region 152 based on an updated frequency of access according to an embodiment. In other embodiments, the process of FIG. 6 can be performed by a processor of host 101 using, for example, a driver or other application executed by host 101, or a logical partitioning of DSD 106. The process of FIG. 6 may take place after any of the processes of FIG. 2, 3, or 5 above. In some implementations, the process of FIG. 6 may be triggered by a new access of data stored in second region 154 or by new information provided by host 101. In other implementations, the process of FIG. 6 may be performed periodically after a predetermined amount of time or after a predetermined amount of data has been stored in DSD 106.

In block 602, controller 120 determines an updated frequency of access for data stored in second region 154 that is no longer stored in first region 152. The updated frequency of access can be based on a table or history maintained by controller 120 relating to previous read commands and/or previous write commands. In some implementations, the updated frequency of access may be based on an indication from host 101 through hinting or the assignment of a priority to the data.

In block 604, controller 120 compares the updated frequency of access to the threshold. The threshold of block 604 can be the same threshold as used above in FIG. 2, 3, or 5, or the threshold may have a different value for data to be copied back to first region 152 from second region 154. The comparison can be a check as to whether the updated frequency of access is less than, equal to, or greater than the threshold.

In block 606, controller 120 controls head 136 based on the comparison in block 604 to write a copy of the data in first region 152 with a track density different from the track density of second region 154. As discussed above with reference to FIG. 2, the first track density of first region 152 can be less than or greater than the second track density of second region 154.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A Data Storage Device (DSD), comprising:
- at least one disk for storing data including a first region and a second region;
- at least one head for reading and writing data on the at least one disk; and
- a controller configured to:
  - control the at least one head to write data in the first region with a first track density;
  - determine a frequency of access for the data written in the first region;
  - compare the frequency of access for the data written in the first region to a threshold; and
  - based on the comparison, control the at least one head to write a copy of the data written in the first region in the second region with a second track density different than the first track density.

2. The DSD of claim 1, wherein the frequency of access is based on a number of previous read commands to access the data.

3. The DSD of claim 1, wherein the frequency of access is based on a number of previous write commands to modify the data.

4. The DSD of claim 1, wherein the frequency of access is based on information provided from a host in communication with the DSD.

5. The DSD of claim 1, wherein the controller is further configured to:
- determine whether the frequency of access for the data written in the first region is less than the threshold; and
- if the frequency of access is less than the threshold, control the at least one head to write a copy of the data written in the first region in the second region with the second track density, wherein the second track density is greater than the first track density.

6. The DSD of claim 1, wherein the controller is further configured to:
- determine whether the frequency of access for the data written in the first region is greater than or equal to the threshold; and
- if the frequency of access is greater than or equal to the threshold, control the at least one head to write a copy of the data written in the first region in the second region with the second track density, wherein the second track density is less than the first track density.

7. The DSD of claim 1, wherein the controller is further configured to adjust the threshold based on a remaining available data capacity of the first region.

8. The DSD of claim 1, wherein the second track density is greater than the first track density, and wherein the controller is further configured to perform an Inter-Track Interference Cancellation (ITIC) operation for data stored in the second region without performing the ITIC operation for data stored in the first region, and in performing the ITIC operation, the controller is further configured to:
- control the at least one head to read data from a target track in the second region;
- control the at least one head to read data from an adjacent track in the second region that is adjacent the target track; and
- account for an effect of the data in the adjacent track on the data in the target track.

9. The DSD of claim 1, wherein the second track density is greater than the first track density, and wherein the controller is further configured to perform a refresh operation for data stored in the second region without performing the refresh operation for data stored in the first region, and in performing the refresh operation, the controller is further configured to:
- identify data in the second region that is susceptible to interference from an adjacent track; and
- control the at least one head to rewrite the data that is susceptible to interference from the adjacent track on the at least one disk.

10. The DSD of claim 1, wherein the first track density is lower than the second track density and the first region is located in a middle diameter portion of the at least one disk.

11. The DSD of claim 1, wherein the controller is further configured to:
- determine an updated frequency of access for data written in the second region that is no longer stored in the first region;
- compare the updated frequency of access to the threshold; and
- based on the comparison, control the at least one head to write a copy of the data stored in the second region in the first region with the first track density.

12. A method for managing data stored in a Data Storage Device (DSD) including at least one disk for storing data, the method comprising:
- writing data in a first region of the at least one disk with a first track density;
- determining a frequency of access for the data written in the first region;
- comparing the frequency of access for the data written in the first region to a threshold; and based on the comparison, writing a copy of the data written in the first region in a second region of the at least one disk with a second track density different than the first track density.

13. The method of claim 12, wherein the frequency of access is based on a number of previous read commands to access the data.

14. The method of claim 12, wherein the frequency of access is based on a number of previous write commands to modify the data.

15. The method of claim 12, wherein the frequency of access is based on information provided from a host in communication with the DSD.

16. The method of claim 12, further comprising:

determining whether the frequency of access for the data written in the first region is less than the threshold; and if the frequency of access is less than the threshold, writing a copy of the data written in the first region in the second region with the second track density, wherein the second track density is greater than the first track density.

17. The method of claim 12, further comprising:

determining whether the frequency of access for the data written in the first region is greater than or equal to the threshold; and if the frequency of access is greater than or equal to the threshold, writing a copy of the data written in the first region in the second region with the second track density, wherein the second track density is less than the first track density.

18. The method of claim 12, further comprising adjusting the threshold based on a remaining available data capacity of the first region.

19. The method of claim 12, wherein the second track density is greater than the first track density, and wherein the method further comprises performing an Inter-Track Interference Cancellation (ITIC) operation for data stored in the second region without performing the ITIC operation for data stored in the first region, and in performing the ITIC operation, the method further comprises:

reading data from a target track in the second region;

reading data from an adjacent track in the second region that is adjacent the target track; and accounting for an effect of the data in the adjacent track on the data in the target track.

20. The method of claim 12, wherein the second track density is greater than the first track density, and wherein the method further comprises performing a refresh operation for data stored in the second region more frequently than for data stored in the first region, and in performing the refresh operation, the method further comprises:

identifying data that is susceptible to interference from an adjacent track; and rewriting the data that is susceptible to interference from the adjacent track on the at least one disk.

21. The method of claim 12, wherein the first track density is lower than the second track density and the first region is located in a middle diameter portion of the at least one disk.

22. The method of claim 12, further comprising:

determining an updated frequency of access for data written in the second region that is no longer stored in the first region;

comparing the updated frequency of access to the threshold; and based on the comparison, writing a copy of the data stored in the second region in the first region with the first track density.

23. A non-transitory computer readable medium storing computer-executable instructions for managing data stored in a Data Storage Device (DSD) including at least one disk for storing data, wherein when the computer-executable instructions are executed by a controller, the computer-executable instructions cause the controller to:

write data in a first region of the at least one disk with a first track density;

determine a frequency of access for the data written in the first region;

compare the frequency of access for the data written in the first region to a threshold; and based on the comparison, write a copy of the data written in the first region in a second region of the at least one disk with a second track density different than the first track density.

24. A host in communication with a Data Storage Device (DSD), the host comprising:

an interface for communicating with the DSD; and a processor configured to:

store data in a first region of at least one disk of the DSD with a first track density;

determine a frequency of access for the data stored in the first region;

compare the frequency of access for the data stored in the first region to a threshold; and based on the comparison, store a copy of the data written in the first region in a second region of the at least one disk with a second track density different than the first track density.

* * * * *